(12) United States Patent
Bhattacharya et al.

(10) Patent No.: US 8,106,817 B2
(45) Date of Patent: Jan. 31, 2012

(54) POSITIONING SYSTEM AND POSITIONING METHOD

(75) Inventors: Tarun Kumar Bhattacharya, San Jose, CA (US); Hassan Mohamed El-Sallabi, Palo Alto, CA (US); Scot Douglas Gordon, Redmond, WA (US); Yasuhiro Oda, Kanagawa (JP); Jiyun Shen, Kanagawa (JP)

(73) Assignees: Polaris Wireless, Inc., Mountain View, CA (US); NTT DoCoMo, Inc., Tokyo (JP)

( * ) Notice: Subject to any disclaimer, the term of this patent is extended or adjusted under 35 U.S.C. 154(b) by 164 days.

(21) Appl. No.: 12/651,014

(22) Filed: Dec. 31, 2009

(65) Prior Publication Data

US 2011/0156951 A1 Jun. 30, 2011

(51) Int. Cl.
*G01S 19/48* (2010.01)
*G01S 19/46* (2010.01)

(52) U.S. Cl. .............. 342/357.31; 342/357.29

(58) Field of Classification Search ............ 342/357.31, 342/357.29
See application file for complete search history.

(56) References Cited

U.S. PATENT DOCUMENTS

| | | | | |
|---|---|---|---|---|
| 5,936,572 A * | 8/1999 | Loomis et al. | ........... | 342/357.29 |
| 6,603,428 B2 * | 8/2003 | Stilp | ............. | 342/457 |
| 6,625,200 B1 * | 9/2003 | Dent | ............. | 375/142 |
| 6,720,922 B2 * | 4/2004 | Williams et al. | ............. | 342/465 |
| 6,965,760 B1 * | 11/2005 | Chen et al. | ............. | 455/226.1 |
| 2003/0063028 A1 * | 4/2003 | Caswell et al. | .......... | 342/357.15 |
| 2004/0097237 A1 * | 5/2004 | Aoyama | ............. | 455/445 |
| 2004/0174297 A1 * | 9/2004 | Cho | ............. | 342/357.14 |
| 2005/0228589 A1 * | 10/2005 | Diggelen et al. | ............. | 702/1 |
| 2010/0057349 A1 * | 3/2010 | Akiyama | ............. | 701/207 |
| 2010/0291947 A1 * | 11/2010 | Annamalai | ............. | 455/456.1 |
| 2010/0311480 A1 * | 12/2010 | Raines et al. | ............. | 455/575.7 |

FOREIGN PATENT DOCUMENTS

JP 07231473 8/1995

OTHER PUBLICATIONS

Sakai, Takeyasu, "GPS Technology Guide", Feb. 28, 2003, Publisher: Tokyo Denki University Press, Published in: JP.

* cited by examiner

*Primary Examiner* — Thomas Tarcza
*Assistant Examiner* — Frank McGue
(74) *Attorney, Agent, or Firm* — DeMont & Breyer, LLC

(57) ABSTRACT

It is an object of the present invention to obtain a positioning result corresponding to the state of a receiver in less time. A positioning server 10 comprises a reception state information acquisition component 12 that acquires reception state information indicating the reception state of a radio wave at a cellular terminal 20, a base station positioning calculator 13 that estimates the approximate position of the cellular terminal 20 on the basis of reception state information and computes the precision of the approximate position, an end decision component 14 that decides whether or not to end the estimation of position on the basis of the precision of the approximate position, and, if it is decided to end the estimation, estimates the position of the cellular terminal 20 as the approximate position and ends the estimation of the position, an indoor/outdoor determination component 15 that determines whether the cellular terminal 20 is indoors or outdoors on the basis of the reception state information, and a positioning controller 16 that controls the execution of the GPS positioning of the cellular terminal 20 on the basis of the result of decision by the end decision component 14 and the result of determination by the indoor/outdoor determination component 15.

5 Claims, 12 Drawing Sheets

POSITIONING SYSTEM AND POSITIONING METHOD

BACKGROUND OF THE INVENTION

1. Field of the Invention

The present invention relates to a positioning system and a positioning method for estimating the position of a receiver.

2. Related Background Art

There has been proposed in the past a technique for estimating the position of a cellular terminal (mobile communication terminal) or other such receiver on the basis of the reception strength (reception level) of the radio wave received by the receiver. Japanese Patent Application No. H7-231473, which is a Japanese laid-open patent application, discusses a technique for estimating the position of a receiver by taking information indicating the relation between the reception strength of a radio wave received from a specific base station and the position at which this radio wave was received, storing this information in a database, and using this database to match with reception strength.

Also known in the past was a technique for using a GPS (global positioning system) to find a receiver (see, for example, "Introduction to GPS Technology" by Takeyasu Isaka, Tokyo Denki University Publishing, Feb. 28, 2003). Another known method is AGPS (assisted GPS), in which positioning is performed by utilizing assist data indicating a satellite position, etc., acquired from a mobile unit communication network.

If finding a position by GPS should fail (that is, if the GPS positioning result is not fixed), base station positioning, in which a signal from a mobile unit communication network is used to perform positioning by pattern matching as mentioned above, or positioning called hybrid positioning, which combines a signal from a GPS satellite and a signal from a mobile unit communication network, is sometimes performed.

With conventional methods, however, whether or not positioning by GPS was successful could not be decided without actually commencing the positioning. Also, GPS positioning that entailed the above-mentioned decision took a long time. And a UE-based AGPS positioning method, in which computation is performed by the receiver, took an especially long time. For example, indoors where a signal cannot be received from a GPS satellite, after GPS positioning has proven impossible, the system switched to a different type of positioning such as base station positioning, so the overall positioning took a long time. In this case, the positioning precision is poor for how long the positioning takes. Also, in cities and the like, even outdoors the effect of multipulses can prevent good GPS positioning precision from being attained.

SUMMARY OF THE INVENTION

The present invention was conceived in light of the above situation, and it is an object thereof to provide a positioning system and positioning method with which a positioning result that corresponds to the state of the receiver can be obtained in less time.

To achieve the stated object, the positioning system pertaining to the present invention is a positioning system for estimating the position of a receiver that has a wireless communication function and a receiving function for signals used in GPS positioning, the system comprising reception state information acquisition means for acquiring reception state information indicating the reception state of a radio wave produced by the wireless communication function of the receiver, approximate position estimation means for estimating the approximate position of the receiver and computing the precision of the approximate position on the basis of the reception state information acquired by the reception state information acquisition means, end decision means for deciding whether or not to end the estimation of the position of the receiver on the basis of the precision computed by the approximate position estimation means, and, if it is decided to end the estimation, estimating the position of the receiver as the approximate position estimated by the approximate position estimation means and ending the estimation of the position, indoor/outdoor determination means for determining whether the receiver is indoors or outdoors on the basis of the reception state information acquired by the reception state information acquisition means, and positioning control means for controlling the execution of GPS positioning of the receiver on the basis of a result of decision by the end decision means and a result of determination by the indoor/outdoor determination means.

With the positioning system pertaining to the present invention, the approximate position of the receiver is estimated and the precision of the approximate position is computed on the basis of reception state information pertaining to the receiver. Whether or not to end the estimation of the position of the receiver is decided on the basis of the precision of this approximate position. Therefore, if the precision of the approximate position is sufficiently good, GPS positioning is not performed at this point, and the estimation of the position of the receiver is ended. Meanwhile, with the positioning system pertaining to the present invention, whether the receiver is indoors or outdoors is determined on the basis of reception state information pertaining to the receiver. The execution of GPS positioning is controlled on the basis of the decision about whether or not to end the estimation of the position of the receiver and the determination about whether the receiver is indoors or outdoors.

Therefore, control can be performed so that even if the receiver does not perform GPS positioning, if the approximate position has sufficient precision, or if GPS positioning is difficult to perform, GPS positioning is not executed, and otherwise GPS positioning is executed. Also, with the above positioning system, whether or not GPS positioning is performed can be controlled without actually performing GPS positioning, which takes a long time to decide if it has been executed. Specifically, with the positioning system pertaining to the present invention, a positioning result corresponding to the state of the receiver can be obtained in less time.

Preferably, the positioning control means controls the execution of positioning that estimates the position of the receiver on the basis of the result of decision by the end decision means and the result of determination by the indoor/outdoor determination means and also on the basis of new reception state information acquired by the reception state information acquisition means, at a timing that differs from that of the reception state information used to estimate the approximate position by the approximate position estimation means. With this constitution, the positioning result of the receiver can be obtained even when GPS positioning is not performed.

Preferably, the reception state information acquisition means acquires strength information indicating the reception strength corresponding to an emission source of the radio wave as the reception state information, and the estimation of the approximate position by the approximate position estimation means and the estimation of the position of the receiver which uses the reception state information and the execution of which is controlled by the positioning control means, are carried out by a method in which the position of the receiver is estimated by storing in advance information indicating the relation between the position and reception strength of the radio wave corresponding to the emission source of the radio wave, and by comparing the strength information acquired by the reception state information acquisition means with the information stored in advance. With this constitution, the position of the receiver can be reliably and favorably estimated on the basis of the radio wave received by the wireless communication function of the receiver.

Preferably, the reception state information acquisition means acquires information indicating the emission source of the radio wave received by the receiver as the reception state information, the approximate position estimation means acquires information indicating the size of a communication area of the emission source indicated by the information acquired by the reception state information acquisition means, and estimates the position of the receiver on the basis of the size of the communication area, and the end decision means decides whether or not to end the position estimation by the position estimation means on the basis of the information indicating the size of the communication area of the emission source acquired by the approximate position estimation means. With this constitution, the positioning result can be acquired easily depending on the environment in which the receiver is placed.

The present invention can be described as an invention of a positioning system as discussed above, or it can be described as an invention of a positioning method as follows. Only the categories here are different, and the invention is substantially the same in both cases, as are the action and effect.

Specifically, the positioning method pertaining to the present invention is a positioning method for estimating the position of a receiver that has a wireless communication function and a receiving function for signals used in GPS positioning, the method comprising a reception state information acquisition step of acquiring reception state information indicating the reception state of a radio wave produced by the wireless communication function of the receiver, an approximate position estimation step of estimating the approximate position of the receiver and computing the precision of the approximate position on the basis of the reception state information acquired in the reception state information acquisition step, an end decision step of deciding whether or not to end the estimation of the position of the receiver on the basis of the precision computed in the approximate position estimation step, and, if it is decided to end the estimation, estimating the position of the receiver as the approximate position approximate position estimated in the approximate position estimation step and ending the estimation of the position, an indoor/outdoor determination step of determining whether the receiver is indoors or outdoors on the basis of the reception state information acquired in the reception state information acquisition step, and a positioning control step of controlling the execution of GPS positioning of the receiver on the basis of a result of decision in the end decision step and a result of determination in the indoor/outdoor determination step.

With the present invention, control can be performed so that even if the receiver does not perform GPS positioning, if the approximate position has sufficient precision, or if GPS positioning is difficult to perform, GPS positioning is not executed, and otherwise GPS positioning is executed. Also, whether or not GPS positioning is executed can be controlled without actually performing GPS positioning, which takes a long time to decide if it has been executed. Specifically, with the present invention, a positioning result corresponding to the state of the receiver can be obtained in less time.

DESCRIPTION OF THE PREFERRED EMBODIMENTS

Figure 1:
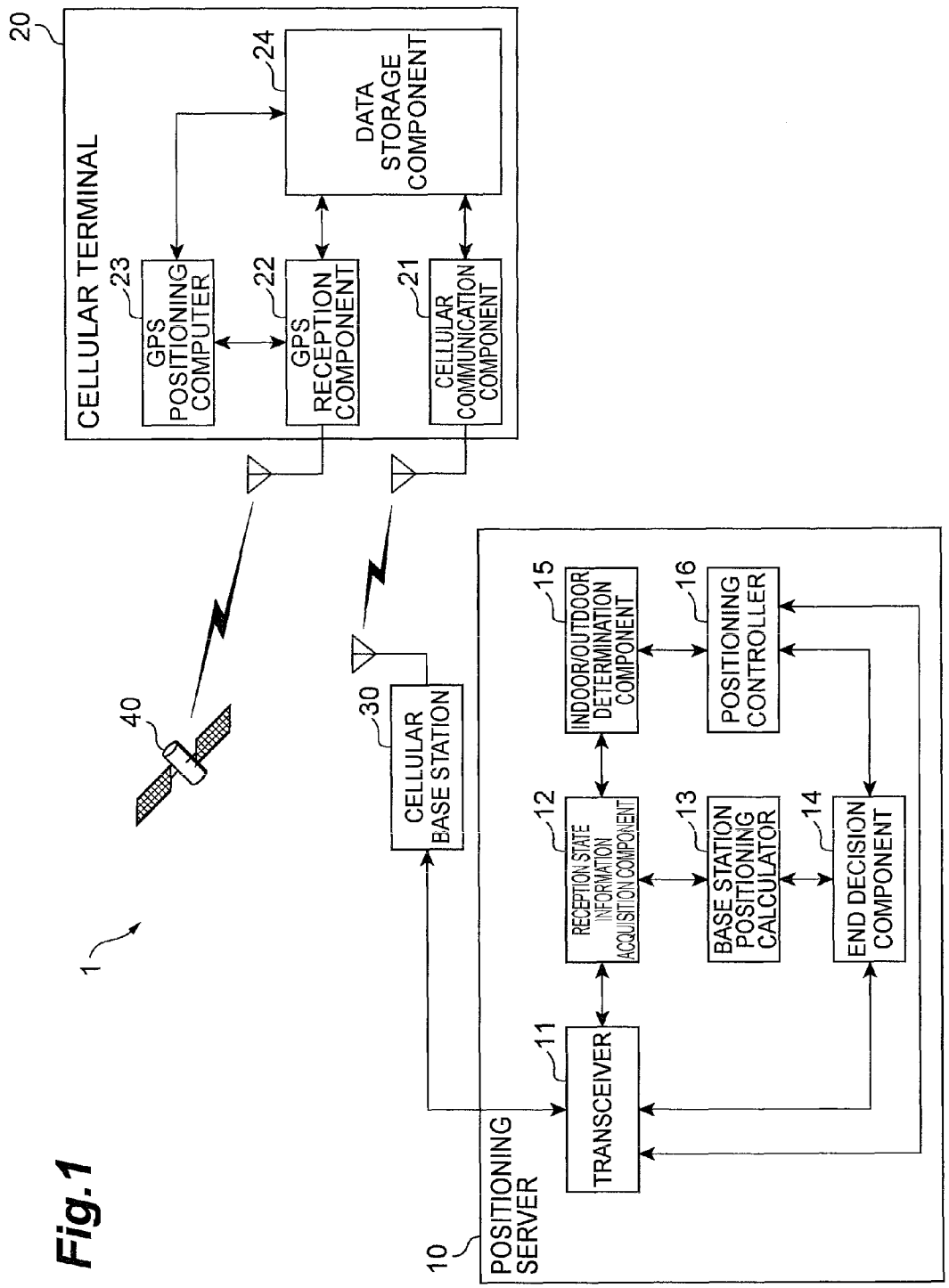
FIG. 1 is a diagram illustrating the functional configuration of a cellular terminal (receiver) and a positioning server constituting the positioning system pertaining to an embodiment of the present invention.

Preferred embodiments of the positioning system and positioning method pertaining to the present invention will now be described in detail along with the drawings. Those elements that are the same in the drawings will be numbered the same, and redundant description will be omitted.

FIG. 1 shows a positioning system 1 pertaining to this embodiment. A positioning system is a system for estimating the position of a cellular terminal (mobile communication terminal) 20 that is the receiver pertaining to this embodiment, and comprises a positioning server 10 and the cellular terminal 20. The positioning server 10 is a device for estimating the position of the cellular terminal 20 (performing comprehensive processing). The (control of the) positioning of the cellular terminal 20 by the positioning server 10 is performed by using only the framework of a cellular communication system (mobile communication system). The positioning server 10 is connected with a plurality of cellular base stations 30 included in the cellular communication system, and can send and receive information to and from each of the cellular base stations 30. Communication with the cellular terminal 20 can also be performed via the cellular base stations 30. The positioning server 10 may also be included in a cellular communication system (mobile communication system).

The cellular terminal 20 that is the object of positioning will be described before the positioning server 10 pertaining to this embodiment is described in detail. The cellular terminal 20 is a device that has a wireless communication function and a receiving function for signals used in GPS positioning (AGPS positioning). The cellular terminal 20 also has a function that performs GPS positioning computation. More specifically, the cellular terminal 20 comprises a cellular communication component 21, a GPS reception component 22, a GPS positioning computer 23, and a data storage component 24, as shown in FIG. 1.

The cellular communication component 21 is a means for performing cellular communication (mobile unit communication) by wireless communication between the plurality of cellular base stations 30 included in the cellular communication network (mobile unit communication network) of the cellular communication system. The cellular communication component 21 is provided with an antenna for cellular communication, and this antenna is used to perform cellular communication. The cellular communication component 21 performs ordinary cellular communication such as telephone communication, and also acquires information by cellular communication used for positioning of its own terminal 20 in the positioning server 10. How this information is acquired will be discussed in more specific terms below. The cellular communication component 21 stores the acquired information in the data storage component 24.

Also, the cellular communication component 21 sends and receives information to and from the positioning server 10 via the cellular base stations 30 (cellular communication network). The cellular communication component 21 sends the positioning server 10 information that is stored in the data storage component 24 and used by the positioning server 10 for positioning, and more specifically, the measurement report information (discussed below). Information sent from the cellular communication component 21 to the positioning server 10 includes information indicating the GPS positioning result (discussed below), information related to wireless communication (discussed below), or information for producing information related to wireless communication. This transmission is triggered by user operation of the terminal 20 or by a request from the positioning server 10, for example, when the cellular terminal 20 is being positioned.

The GPS reception component 22 is a means for receiving a signal that is sent from a GPS satellite 40 and used for positioning. The GPS reception component 22 is provided with an antenna for receiving signals from a GPS satellite, and this antenna is used to perform reception. The GPS reception component 22 stores information related to the signals received from GPS satellites 40 and used in GPS positioning computation, in the data storage component 24.

The GPS satellites 40 are located at specific places corresponding to the time of day, and send positioning signals from this location. More specifically, four or five of the GPS satellites 40 are disposed in six orbits at an altitude of approximate position 20,000 kilometers, and move along their orbits as time passes. The positioning signals sent by the GPS satellites 40 include identification information for identifying a specific GPS satellite 40, information indicating the orbit of the GPS satellites 40, and information indicating the time a signal was sent.

The GPS positioning computer 23 is one position estimation means for calculating by GPS positioning the position of the terminal 20 on the basis of the reception state of a signal from a GPS satellite 40 received by the GPS reception component 22. More specifically, the GPS positioning computer 23 acquires information about a signal received by the terminal 20 from a GPS satellite 40, which is received by the GPS reception component 22 and stored in the data storage component 24. Then, the GPS positioning computer 23 computes from this information the location of the GPS satellite 40, the distance form the cellular terminal 20 to the GPS satellite 40, and so forth, and computes the location of the terminal 20. For this computation, assist data acquired from the cellular communication system and indicating the location of the GPS satellite 40, etc., may be used (in which case the positioning will be AGPS (assisted GPS)). The starting and ending of the reception of signals from the GPS satellite 40 by the GPS reception component 22 and the GPS positioning computation by the GPS positioning computer 23 are triggered, for example, by the receipt of an instruction from the positioning server 10 by the cellular terminal 20, which will be discussed below.

The GPS positioning computer 23 sends information indicating the computed location of the terminal 20 to the positioning server 10 as information about the positioning result of GPS positioning. If computation of the location of the terminal 20 by GPS positioning should fail, the GPS positioning computer 23 sends the positioning server 10 a notification to this effect. This information is included in the measurement report information that is sent.

The data storage component 24 holds information used for positioning and acquired by the cellular communication component 21 and the GPS reception component 22. The above is the functional configuration of the cellular terminal 20.

Figure 2:
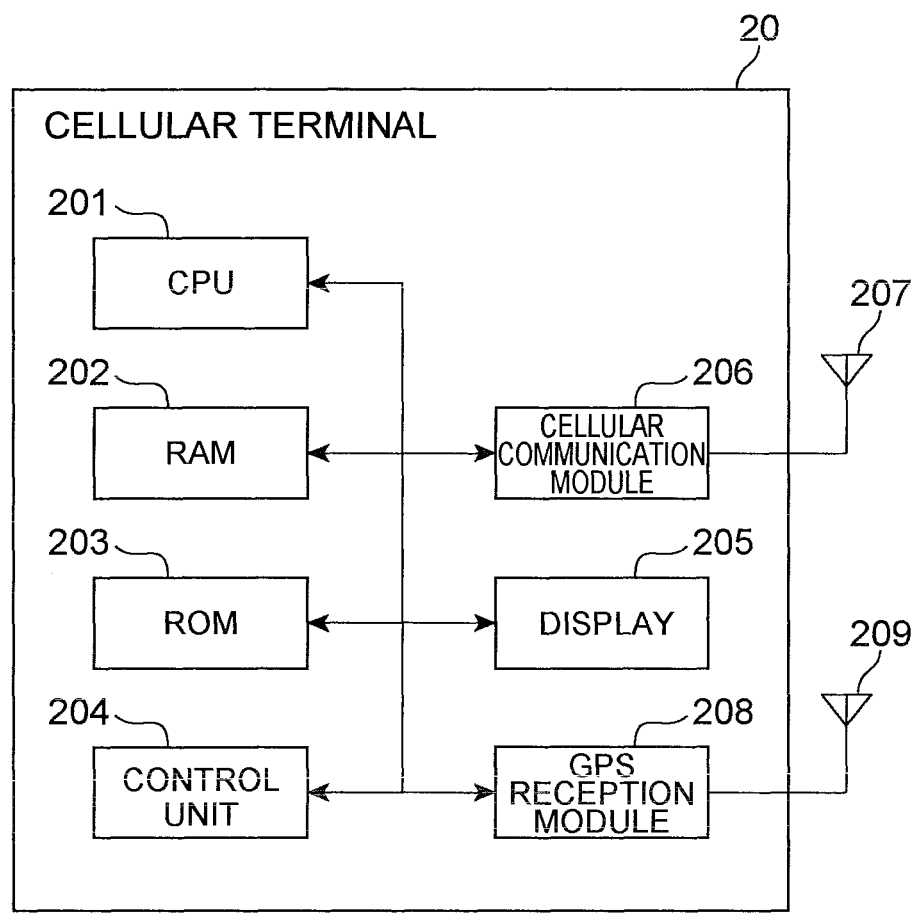
FIG. 2 is a diagram illustrating the hardware configuration of a cellular terminal (receiver) pertaining to an embodiment of the present invention.

FIG. 2 illustrates the hardware configuration of a cellular terminal 20 pertaining to this embodiment. As shown in FIG. 2, the cellular terminal 20 is made up of a CPU (central processing unit) 201, a RAM (random access memory) 202, a ROM (read only memory) 203, a control unit 204, a display 205, a cellular communication module 206, a cellular communication antenna 207, a GPS reception module 208, a GPS reception antenna 209, and other such hardware. The functions mentioned above are exhibited when these constituent elements operate. The above is the constitution of the cellular terminal 20.

The positioning server 10 will now be described. As shown in FIG. 1, the positioning server 10 comprises a transceiver 11, a reception state information acquisition component 12, a base station positioning calculator 13, an end decision component 14, an indoor/outdoor determination component 15, and a positioning controller 16.

The transceiver 11 is a means for sending and receiving information to and from the cellular terminal 20 via the cellular base stations 30. The transceiver 11 outputs information received from the cellular terminal 20 to the reception state information acquisition component 12 and the end decision component 14 according what the information is.

The reception state information acquisition component 12 acquires, via the transceiver 11, reception state information sent from the cellular terminal 20 and indicating the reception state of a radio wave produced by the cellular communication component 21 at the cellular terminal 20. Strength information indicating the reception strength corresponding to the cellular base station 30 that is the emission source of the radio wave is used as the reception state information. More specifically, measurement report information (hereinafter abbreviated as MR) including identification information for the cellular base stations 30 (cell ID, base station ID, etc.), which is information measured at the cellular terminal 20, is used. In addition to identification information for the cellular base stations 30, the MR includes information indicating the signal transmission lag (such as the RTT (round trip time)) and the reception strength (reception level) of the received signal associated with the pertinent identification information, information indicating the amount of attenuation, the amount of interference, etc., whether or not GPS positioning is possible, and so forth. Upon acquiring the MR, the reception state information acquisition component 12 outputs it to the base station positioning calculator 13 and the indoor/outdoor determination component 15. The acquisition of MR is carried out intermittently, such as at regular time intervals.

The base station positioning calculator 13 is a position estimation means for estimating the position of the cellular terminal 20 on the basis of the MR acquired by the reception state information acquisition component 12. The estimation of the position of the cellular terminal 20 based on MR is performed by the method given in the above-mentioned Japanese Patent Application No. H7-231473, which involves positioning calculation by pattern matching. Specifically, the base station positioning calculator 13 stores, in a database or the like, information indicating the relation between the reception strength of the radio wave received from a specific cellular base station 30 and the location where this radio wave is received. The base station positioning calculator 13 matches the information stored in this database with the reception strength corresponding to the cellular base station 30 indicated by the MR, and the location associated with the reception strength of a pattern similar to the reception strength indicated by the MR is termed the location of the cellular terminal 20.

The base station positioning calculator 13 estimates the location of the cellular terminal 20 as discussed above, and also estimates the positioning error of this location. The estimation of positioning error here is carried out in the same manner as the estimation of positioning error by a conventional positioning method that involves pattern matching. The base station positioning calculator 13 computes, for example, the degree of match Pi between the reception strength of the MR and the reception strength associated with each location stored in the database. Then, the base station positioning calculator 13 computes the positioning error Ei using the following function, for example, in which Pi is a variable.

$$Ei = A/Pi$$

Here, A is a system parameter stored in advance by the base station positioning calculator 13. As an example of how Pi is computed, it is possible to use the Euclid distance between a measurement result M and a database D. We will let i be a number that uniquely identifies a position coordinate in the database, and let j be a base station number received by measurement, and Pi is calculated by the following formula for all the position coordinates i in the database.

$$Pi = \frac{1}{\sqrt{\sum_j (M_j - D_{i,j})^2}}$$

The position where Pi is greatest is the position with the best match. It is also possible to use the size of the grid in the database for A. That is, the distance between adjacent positions in the database is used as A.

The base station positioning calculator 13 uses a plurality of MR to perform positioning calculation when a plurality of MR are acquired in positioning of the cellular terminal 20 one time. More specifically, the base station positioning calculator 13 averages the reception strength of the radio wave indicated by a plurality of MR for each of the cellular base stations 30, and uses the averaged reception strength to perform matching. In pattern matching positioning, measurement is repeated at the cellular terminal 20, and increasing the number of MR has the effect of eliminating fluctuation in the measurement result caused by measurement error or multipulses, so positioning precision is improved. As discussed below, the MR is sent to the positioning server 10 every time MR is measured at the cellular terminal 20, so the base station positioning calculator 13 performs pattern matching positioning calculation every time this happens. The base station positioning calculator 13 outputs to the end decision component 14 information indicating the location of the cellular terminal 20 obtained by pattern matching positioning calculation, and information indicating the calculated positioning error.

The base station positioning calculator 13 is an approximate position estimation means for estimating the approximate position of the cellular terminal 20 and also computing the precision of this approximate position by the above-mentioned pattern matching positioning method from the MR initially acquired in positioning of the cellular terminal 20. The above-mentioned positioning error is used as the precision of the approximate position. The base station positioning calculator 13 outputs information about the approximate position found as above to the end decision component 14. The calculation of the approximate position does not necessarily have to be based on a single MR, and may instead be based on MR from a number of times. Since the approximate position is found in a short time along with the determination of indoors or outdoors as discussed below, it may be found on the basis of the same information as that used for the determination of indoors or outdoors.

Furthermore, the base station positioning calculator 13 may estimate the position of the cellular terminal 20 by a method other than the one described above. More specifically, the base station positioning calculator 13 acquires the cell ID of the cellular base station 30 that is the emission source of the radio wave received by the cellular terminal 20. The cell ID may be acquired from MR just as above, or, in this case, since there is no need for reception strength information, etc., it may be sent separately from the cellular terminal 20. The cell ID used here pertains to a single cell, and if the MR includes information about a plurality of cells, then information about the cell with the highest reception strength above a specific reception strength is used.

Then base station positioning calculator 13 then estimates the radius R of the cell (the size of the cell), which is the communication area of the cellular base station 30 pertaining to the cell ID. The estimation of the cell radius R is performed in the same way as in a conventional method. For instance, information indicating the cell radius corresponding to the cell ID is stored in advance in the base station positioning calculator 13 in a cell radius database, and the cell radius R is estimated on the basis of this. Alternatively, information indicating the positional relation of the cell is stored in advance, and information for the adjacent cell is used to estimate the cell radius R.

The base station positioning calculator 13 compares the estimated cell radius R with a threshold dr that was stored in advance. If the base station positioning calculator 13 decides that the estimated cell radius is below the threshold dr, it can be estimated that the cellular terminal 20 is located at the position of that cell (the position of the cellular base station 30), and that cell ID is used as the positioning result. The threshold dr is suitably set according to the required precision of positioning with respect to the cellular terminal 20. Usually, if the required precision is relatively low, the threshold dr is set relatively large. If the base station positioning calculator 13 decides that the estimated cell radius is not below the threshold dr, then the positioning result is that the position cannot be estimated by cell ID.

As discussed below, the estimation of the position of the cellular terminal 20 using a cell ID is preferably performed as the first processing in the estimation processing for the position of the cellular terminal 20. This is because if the position of the cellular terminal 20 can estimated with such simple computation and information, then pattern matching position computation and GPS positioning computation need not be performed. When the above-mentioned position estimation using a cell ID is to be performed, the base station positioning calculator 13 notifies the end decision component 14 about the positioning result.

The end decision component 14 is an end decision means for deciding whether or not to end the estimation of the position of the cellular terminal 20 on the basis of specific end conditions. More specifically, the end decision component 14 decides whether or not to end the estimation of the position of the cellular terminal 20 on the basis of the precision of the approximate position of the cellular terminal 20 estimated by the base station positioning calculator 13. The end decision component 14 makes its decision based on the precision of the approximate position by deciding whether or not the positioning error of the approximate position indicated by the information inputted from the base station positioning calculator 13 is less than a threshold. If the end decision component 14 decides that the positioning error is below the threshold, it decides that the precision of the approximate position is adequate, and ends the estimation of the position of the cellular terminal 20. The above-mentioned threshold is a value stored in advance in the end decision component 14, and is suitably set according to the required precision of the cellular terminal 20. In this case, the end decision component 14 terms the approximate position to be the position of the cellular terminal 20.

As discussed above, if the end decision component 14 decides to end the estimation of the position of the cellular terminal 20, it sends a signal that halts positioning processing to the cellular terminal 20 via the transceiver 11. Specifically, it sends a signal that halts the reception of signals from the GPS satellite 40, the GPS positioning computation, and the measurement of MR. There may be an instruction to commence processing pertaining to GPS positioning when the positioning server 10 decides that GPS positioning is to be performed, as discussed below. Also, the end decision component 14 outputs information indicating the position of the cellular terminal 20 estimated as above, corresponding to the usage details, such as sending it to the cellular terminal 20.

If the end decision component 14 decides that the positioning error is not below the threshold, it decides that the precision of the approximate position is insufficient, and does not end the estimation of the position of the cellular terminal 20. In the above-mentioned decision, if it is decided not to end the estimation of the position of the cellular terminal 20 (if it is not decided to end it), either pattern matching positioning or GPS positioning is carried out as discussed below. In that case, the end decision component 14 decides to end the positioning as discussed below. Also, the end decision component 14 outputs to the positioning controller 16 information about the result of deciding whether or not to end positioning processing on the basis of the approximate position.

When GPS positioning is performed, more specifically, the end decision component 14 decides to end the estimation of the position of the cellular terminal 20 upon receiving notification of the GPS positioning result from the cellular terminal 20. If the notification from the cellular terminal 20 is to the effect that the GPS positioning succeeded and a positioning result has been obtained by GPS positioning (if the GPS positioning is fixed), the end decision component 14 uses the above-mentioned approximate position as the position of the cellular terminal 20. On the other hand, if the notification from the cellular terminal 20 is to the effect that GPS positioning failed and a positioning result has not been obtained by GPS positioning (if GPS positioning is not fixed), the end decision component 14 uses the above-mentioned approximate position as the position of the cellular terminal 20. Also, if there is no notification from the cellular terminal 20 even after a specific length of time has elapsed (such as a preset specific time), the end decision component 14 uses the above-mentioned approximate position as the position of the cellular terminal 20. Also, the end decision component 14 outputs information indicating the position of the cellular terminal 20 estimated as above, corresponding to the usage details, such as sending it to the cellular terminal 20.

When pattern matching positioning is performed, or more specifically, when pattern matching is performed on the basis of new MR and the positioning result is inputted from the base station positioning calculator 13 to the end decision component 14, the end decision component 14 decides to end the estimation of the position of the cellular terminal 20. In that case, the positioning error in pattern matching positioning does not necessarily have to be calculated. Alternatively, the end decision component 14 may make a decision as follows. Every time pattern matching positioning computation is performed by the base station positioning calculator 13, the end decision component 14 decides as follows to end the pattern matching positioning. The end decision component 14 decides whether or not to end the estimation of the position of the cellular terminal 20 by deciding whether or not the positioning error of the positioning result obtained by pattern matching positioning computation by the base station positioning calculator 13 is below a threshold $\sigma_T$. If the end decision component 14 decides that the positioning error is less than that threshold $\sigma_T$, it decides to end the estimation of the position of the cellular terminal 20. This means that positioning is ended when the positioning result obtained by pattern matching positioning computation by the base station positioning calculator 13 satisfies a specific positioning precision. The threshold $\sigma_T$ is a value that is stored in the end decision component 14 in advance, and is suitably set according to the required precision of the cellular terminal 20. In this case, the end decision component 14 uses the positioning result from pattern matching positioning as the position of the cellular terminal 20.

The end decision component 14 also decides whether or not to end the estimation of the position of the cellular terminal 20 by deciding whether or not the positioning elapsed time is greater than a threshold T. If the end decision component 14 decides that the positioning elapsed time is greater than the threshold T, it decides to end the estimation of the position of the cellular terminal 20. The positioning elapsed time is measured by the positioning server 10, and is the elapsed time from the start of positioning with respect to the cellular terminal 20. The threshold T is a value that is stored in the end decision component 14 in advance, and is suitably set according to the allowable positioning time. In this case, the end decision component 14 uses the positioning result for pattern matching positioning as the position of the cellular terminal 20. By making the above decisions, a more precise positioning result can be obtained by pattern matching positioning.

As discussed above, if the end decision component 14 decides to end the estimation of the position of the cellular terminal 20, it sends a signal that halts positioning processing to the cellular terminal 20 via the transceiver 11. Specifically, it sends a signal that halts the measurement of MR. Also, the end decision component 14 outputs information indicating the position of the cellular terminal 20 estimated as above, corresponding to the usage details, such as sending it to the cellular terminal 20.

In the above-mentioned decision, if it is decided not to end the estimation of the position of the cellular terminal 20 (if it is not decided to end it), the end decision component 14 instructs the base station positioning calculator 13 to perform pattern matching positioning computation on the basis of new MR acquired at a different timing from that of the MR used in the pattern matching positioning performed by the base station positioning calculator 13. Specifically, when new MR is acquired by the reception state information acquisition component 12, the base station positioning calculator 13 is instructed to use that MR as well to perform pattern matching positioning computation of the cellular terminal 20. However, active control of the base station positioning calculator 13 from the end decision component 14 does not necessarily have to be performed, and the system may be such that pattern matching positioning computation is performed by not performing positioning end processing as above.

Also, when positioning is to be performed on the basis of a cell ID as above, the end decision component 14 decides whether or not to end the estimation of the position of the cellular terminal 20 on the basis of information indicating the positioning result inputted from the base station positioning calculator 13. If the positioning result inputted from the base station positioning calculator 13 is to the effect that positioning could be performed on the basis of cell ID, then the end decision component 14 decides to end the estimation of the position of the cellular terminal 20. Specifically, the end decision component 14 decides whether or not to end the estimation of position on the basis of the cell radius.

If the positioning result inputted from the base station positioning calculator 13 is to the effect that positioning cannot be performed on the basis of cell ID, then the end decision component 14 decides not to end the estimation of the position of the cellular terminal 20. If the end decision component 14 decides to end the estimation of the position of the cellular terminal 20, it sends a signal that halts the processing for positioning with respect to the cellular terminal 20 via the transceiver 11, just as above. Alternatively, since the estimation of the position of the cellular terminal 20 using cell ID is performed as the first processing in the estimation processing for the position of the cellular terminal 20, if the end decision component 14 decides not to end the estimation of the position of the cellular terminal 20, it may send a signal that begins processing for GPS positioning and pattern matching positioning with respect to the cellular terminal 20 via the transceiver 11. In that case, the above-mentioned elapsed time of positioning is counted from that point.

Figure 3:
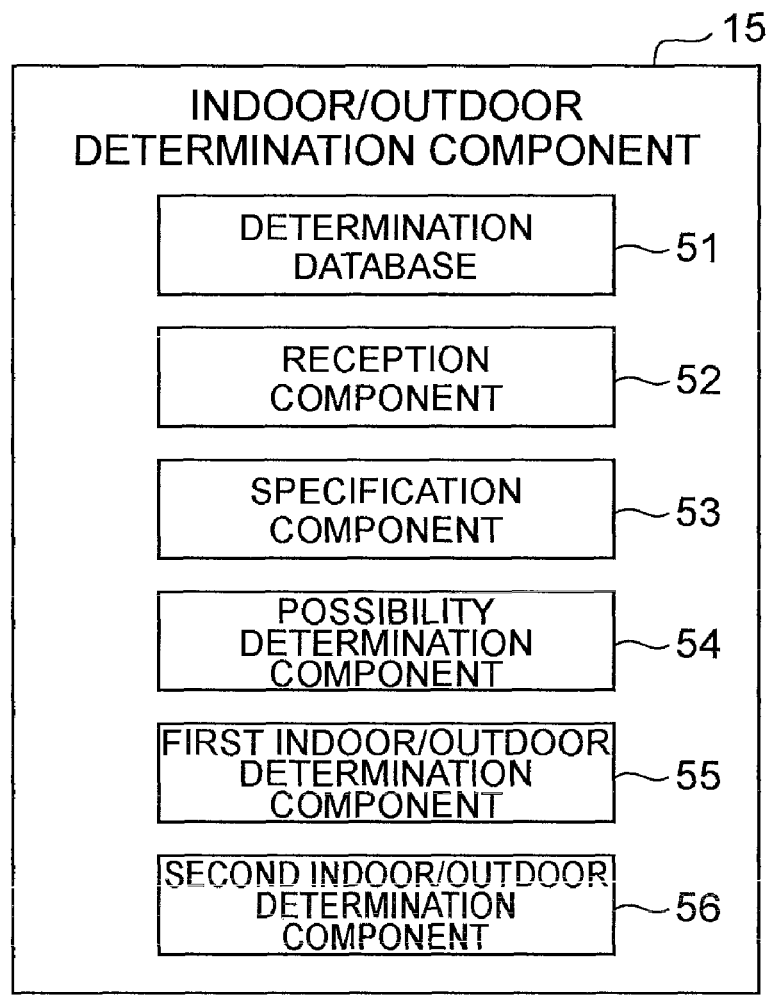
FIG. 3 is a diagram illustrating the functional configuration of an indoor/outdoor determination component.

The indoor/outdoor determination component 15 is an indoor/outdoor determination means for determining whether the cellular terminal 20 is indoors or outdoors on the basis of the MR inputted from the reception state information acquisition component 12. As shown in FIG. 3, the indoor/outdoor determination component 15 more specifically comprises a determination database 51, a reception component 52, a specification component 53, a possibility determination component 54, a first indoor/outdoor determination component 55, and a second indoor/outdoor determination component 56.

Figure 4:
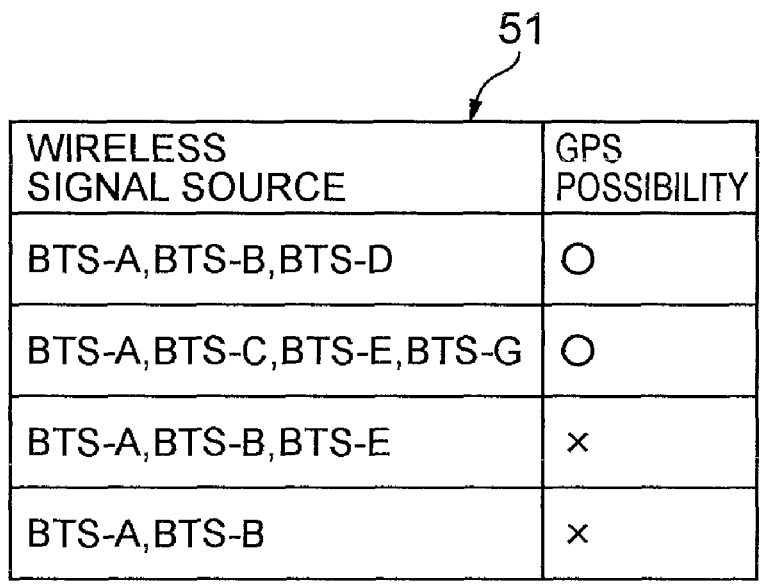
FIG. 4 is a table illustrating an example of information stored in a determination database.

As shown in FIG. 4, the determination database 51 stores combined information for identification information about an outdoor emission source that is assumed to be the emission source (cellular base station 30) of the signals received simultaneously by the cellular terminal 20, and indoor/outdoor characteristic information expressing the indoor or outdoor characteristics of the cellular terminal 20 at the time of signal receipt (as an example here, this is information expressing whether or not GPS positioning is possible (hereinafter referred to as GPS possibility information)), with these groups of information associated. FIG. 4 shows, for example, results from when signals are received simultaneously from emission sources BTS-A, BTS-B, and BTS-D, in which case it is indicated that GPS positioning is possible, and results from when signals are received simultaneously from emission sources BTS-A, BTS-B, and BTS-E, in which case it is indicated that GPS positioning is not possible. The configuration of the determination database 51 will be discussed below.

The reception component 52 receives from the cellular terminal 20 MR that includes information identifying the emission source of the received signal. The specification component 53 specifies the number N of emission sources of received signals from the received MR. The possibility determination component 54 determines whether or not the emission source number N is equal to or greater than the minimum emission source number M at which indoor/outdoor determination is possible on the basis of a first indoor/outdoor determination method (discussed below). The minimum emission source number M is a preset value.

The first indoor/outdoor determination component 55 executes indoor/outdoor determination on the basis of the first indoor/outdoor determination method when the emission source number N is equal to or greater than the minimum emission source number M (that is, when indoor/outdoor determination is possible on the basis of the first indoor/outdoor determination method). An example of the indoor/outdoor determination based on the first indoor/outdoor determination method here is to calculate the approximate position of the cellular terminal 20 by referring to a positioning database in which MR from the cellular terminal 20 has been stored in advance, and determine indoors or outdoors on the basis of whether or not there is a contradiction between the measurement data in the MR and the predicted data in the approximate position.

The second indoor/outdoor determination component 56 executes indoor/outdoor determination on the basis of a second indoor/outdoor determination method (discussed below) when the emission source number N is less than the minimum emission source number M (that is, when indoor/outdoor determination is impossible on the basis of the first indoor/outdoor determination method).

The indoor/outdoor determination component 15 outputs the result of determining whether the cellular terminal 20 is indoors or outdoors to the positioning controller 16 shown in FIG. 1.

The positioning controller 16 is a positioning control means for controlling the execution of GPS positioning of the cellular terminal 20 on the basis of the result of deciding the approximate position by the end decision component 14 and the result of determination by the indoor/outdoor determination component 15. More specifically, the positioning controller 16 does not execute any positioning control when positioning is ended as a result of the decision by the end decision component 14 about the approximate position.

If the result of deciding the approximate position by the end decision component 14 is that positioning is not ended, and the result of determination by the indoor/outdoor determination component 15 is that the cellular terminal 20 is located outdoors, then the positioning controller 16 controls so as to execute GPS positioning of the cellular terminal 20. In that case, more specifically, the positioning controller 16 sends a control signal to the cellular terminal 20 that executes GPS positioning. Alternatively, if the reception of a signal from the GPS satellite 40, GPS positioning computation, and MR measurement have already been performed, which are processing for positioning in the cellular terminal 20, then the positioning controller 16 may send the cellular terminal 20 a signal that does not halt processing for GPS positioning (reception of signals from the GPS satellite 40 and GPS positioning computation), but does halt processing other than GPS positioning (MR measurement).

On the other hand, if the result of deciding the approximate position by the end decision component 14 is that positioning is not ended, and the result of determination by the indoor/outdoor determination component 15 is that the cellular terminal 20 is located indoors, then the positioning controller 16 controls so as to execute pattern matching positioning of the cellular terminal 20. As mentioned above, since pattern matching positioning is performed with calculation of the approximate position as well, the positioning controller 16 does not halt this processing (no need for active control).

Alternatively, active control may be performed such that the positioning controller 16 sends the cellular terminal 20 a control signal to acquire MR and send it to the positioning server 10, and pattern matching positioning computation is performed by the base station positioning calculator 13 once MR is received by the positioning server 10. Alternatively, if the reception of a signal from the GPS satellite 40, GPS positioning computation, and MR measurement have already been performed, which are processing for positioning in the cellular terminal 20, then the positioning controller 16 may send the cellular terminal 20 a signal that does not halt processing for pattern matching positioning (MR measurement), but does halt processing other than pattern matching positioning (reception of a signal from the GPS satellite 40 and GPS positioning computation). The above is the functional configuration of the positioning server 10.

Figure 5:
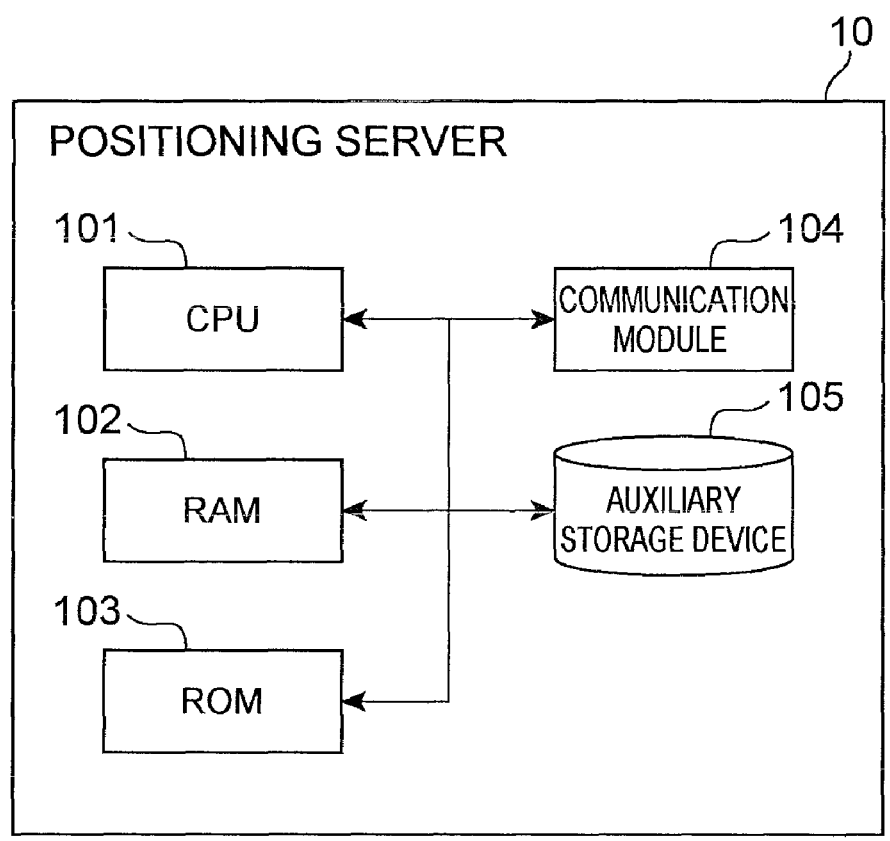
FIG. 5 is a diagram illustrating the hardware configuration of a positioning server pertaining to an embodiment of the present invention.

FIG. 5 shows the hardware configuration of the positioning server 10. As shown in FIG. 5, the positioning server 10 is constituted to include a computer that comprises a CPU 101, a RAM 102 and ROM 103 (main storage devices), a communication module 104 for performing communication, a hard disk or other such auxiliary storage device 105, and other such hardware. These constituent elements operate under programs or the like, thereby exhibiting the functions of the positioning server 10.

Next, the indoor/outdoor determination processing (indoor/outdoor determination method) executed by the indoor/outdoor determination component 15 in this embodiment will be described through reference to the flowchart of FIG. 6. This processing is executed, for example, in an indoor/outdoor determination step (S46 in FIG. 9) by the indoor/outdoor determination component 15 in positioning processing (FIG. 9) as discussed below.

First, at the indoor/outdoor determination component 15, the reception component 52 receives from the cellular terminal 20 MR that includes information for identifying the emission source of the received signal (S21 in FIG. 6), and the specification component 53 counts the number of pieces of emission source identification information included in the received MR and thereby specifies the emission source number N of the received signal (S22). For example, if there are two pieces of emission source identification information included in the received MR, "BTS-A" and "BTS-B," the emission source number N is specified as "2." As to the emission source, received signals belonging to the same cell may be taken to be received signals from the same emission source, or received signals from different sectors belonging to the same cell may be taken to be received signals from different emission sources.

The possibility determination component 54 determines whether or not the emission source number N is equal to or greater than the minimum emission source number M at which indoor/outdoor determination is possible on the basis of a first indoor/outdoor determination method (S23).

In S23, if the emission source number N is equal to or greater than the minimum emission source number M, it can be decided that indoor/outdoor determination is possible on the basis of the first indoor/outdoor determination method, so the first indoor/outdoor determination component 55 executes indoor/outdoor determination on the basis of the first indoor/outdoor determination method (S24). To give an example of this, the approximate position of the cellular terminal 20 is calculated by referring to a positioning database (not shown) in which the MR from the cellular terminal 20 has been stored in advance, and a determination of indoors or outdoors is made on the basis of whether or not there is a contradiction between the measurement data in the MR and the predicted data in the approximate position. The extent P of being indoors is calculated from the magnitude of the contradiction between the measurement data M and the predicted data D in the approximate position. For instance, P=(D−M)/M, where a value less than zero is considered to be zero, and a value greater than 1 is considered to be 1.

On the other hand, in S23, if the emission source number N is less than the minimum emission source number M, it can be decided that indoor/outdoor determination is impossible on the basis of the first indoor/outdoor determination method, so the second indoor/outdoor determination component 56 executes indoor/outdoor determination on the basis of the following second indoor/outdoor determination method.

The second indoor/outdoor determination component 56 extracts from the determination database 51 combined information including all of the emission source identification information included in the MR, and GPS possibility information corresponding to this combined information, and sets the lowest number of emission sources included in the extracted combined information as the minimum emission source number Q (S25).

Figure 7:
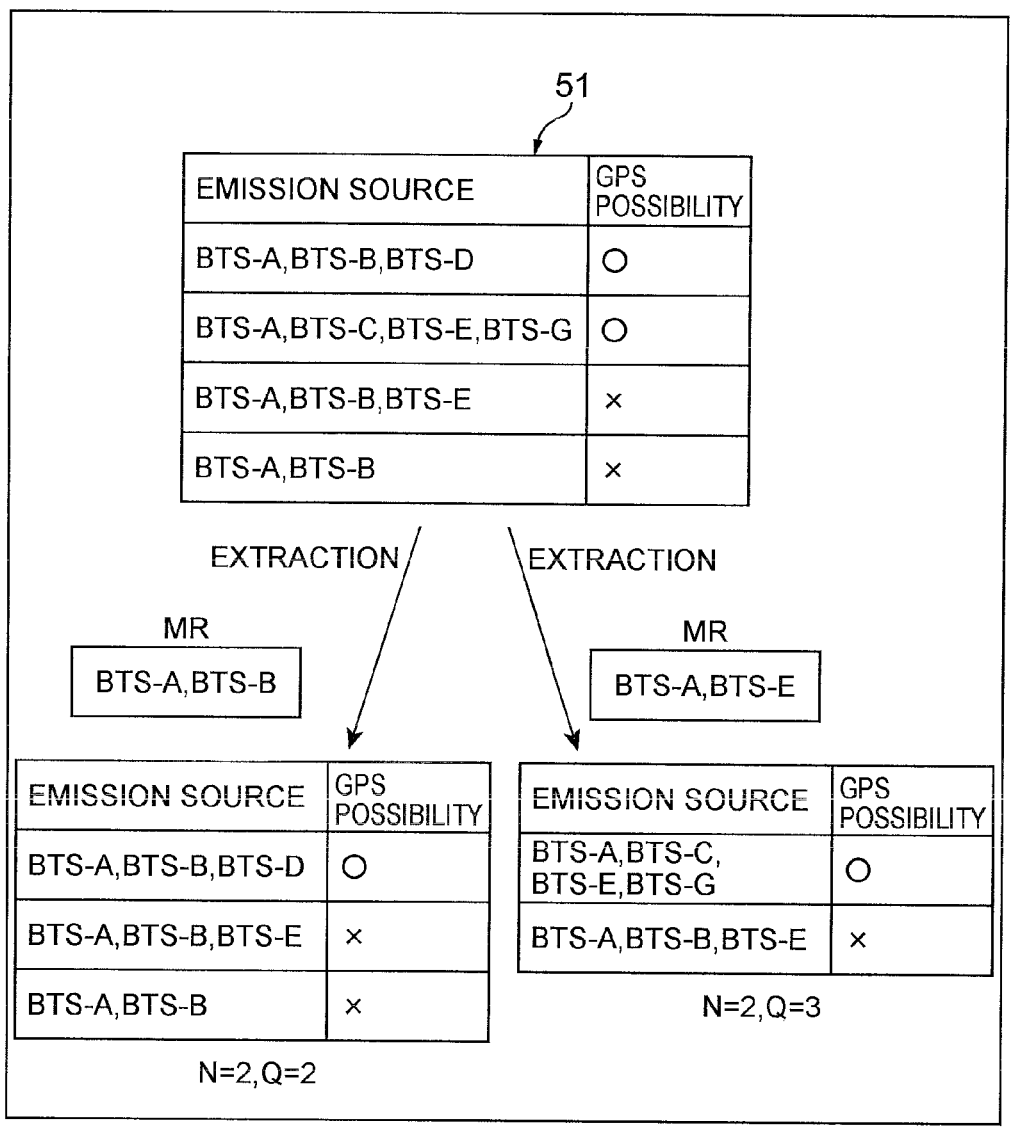
FIG. 7 is a diagram illustrating the processing in FIG. 6.

To give a specific example, as shown in FIG. 7, if the emission source identification information (BTS-A, BTS-B) is included in the MR, three combined information sets consisting of (BTS-A, BTS-B, BTS-D), (BTS-A, BTS-B, BTS-E), and (BTS-A, BTS-B), and GPS possibility information corresponding to these, are extracted from the determination database 51 as the combined information including all of this emission source identification information (BTS-A and BTS-B). The lowest value "2" out of the numbers of emission sources included in the above-mentioned three sets of combined information ("3," "3," and "2" here) is set as the minimum emission source number Q.

To give another example, if the emission source identification information (BTS-A, BTS-E) is included in the MR, two combined information sets consisting of (BTS-A, BTS-C, BTS-E, BTS-G) and (BTS-A, BTS-B, BTS-E), and GPS possibility information corresponding to these, are extracted from the determination database 51 as the combined information including all of this emission source identification information (BTS-A and BTS-E). The lowest value "3" out of the numbers of emission sources included in the above-mentioned two sets of combined information ("4" and "3" here) is set as the minimum emission source number Q.

Next, the second indoor/outdoor determination component 56 determines whether or not the emission source number N is equal to or greater than the minimum emission source number Q (S26). If the emission source number N is equal to or greater than the minimum emission source number Q in S26, it can be decided that the cellular terminal 20 has received a signal from at least the minimum emission source number Q of emission sources, so it is concluded that the cellular terminal 20 is outdoors. In view of this, it is checked to see if there is GPS possibility information corresponding to the same combined information as the combination of emission source identification information included in the MR (S27), and if there is GPS possibility information, indoors or outdoors is determined on the basis of this GPS possibility information (S29). If there is no GPS possibility information, it is determined that the cellular terminal 20 is outdoors (S28). If there is GPS possibility information, when a determination about indoors or outdoors is made on the basis of this GPS possibility information, the degree of matching to this GPS possibility information is used as the extent to which the cellular terminal 20 is indoors. If there is no GPS possibility information, the extent P to which the cellular terminal 20 is outdoors is calculated from the difference between N and Q. For example, P=A(Q−N)/N, where if P is over 1 it is treated as 1, and if under zero it is treated as zero. A is a coefficient, and is a system parameter.

On the other hand, if the emission source number N is less than the minimum emission source number M in S26, it is checked to see if there is GPS possibility information corresponding to the same combined information as the combination of emission source identification information included in the MR (S30), and if there is GPS possibility information, indoors or outdoors is determined on the basis of this GPS possibility information (S29). If there is no GPS possibility information, it is determined whether or not the emission source number N is less than the minimum emission source number P at which indoor/outdoor determination is possible on the basis of the second indoor/outdoor determination method (S31,) and if the emission source number N is less than the minimum emission source number P, it is determined that indoor/outdoor determination is impossible on the basis of the second indoor/outdoor determination method (S33). On the other hand, if the emission source number N is equal to or greater than the minimum emission source number P, it is determined that indoor/outdoor determination is possible on the basis of the second indoor/outdoor determination method, but that the cellular terminal 20 is indoors since it can be decided that the cellular terminal 20 has not received a signal from at least the minimum emission source number M of emission sources, and the reception state is inferior (S32).

Figure 6:
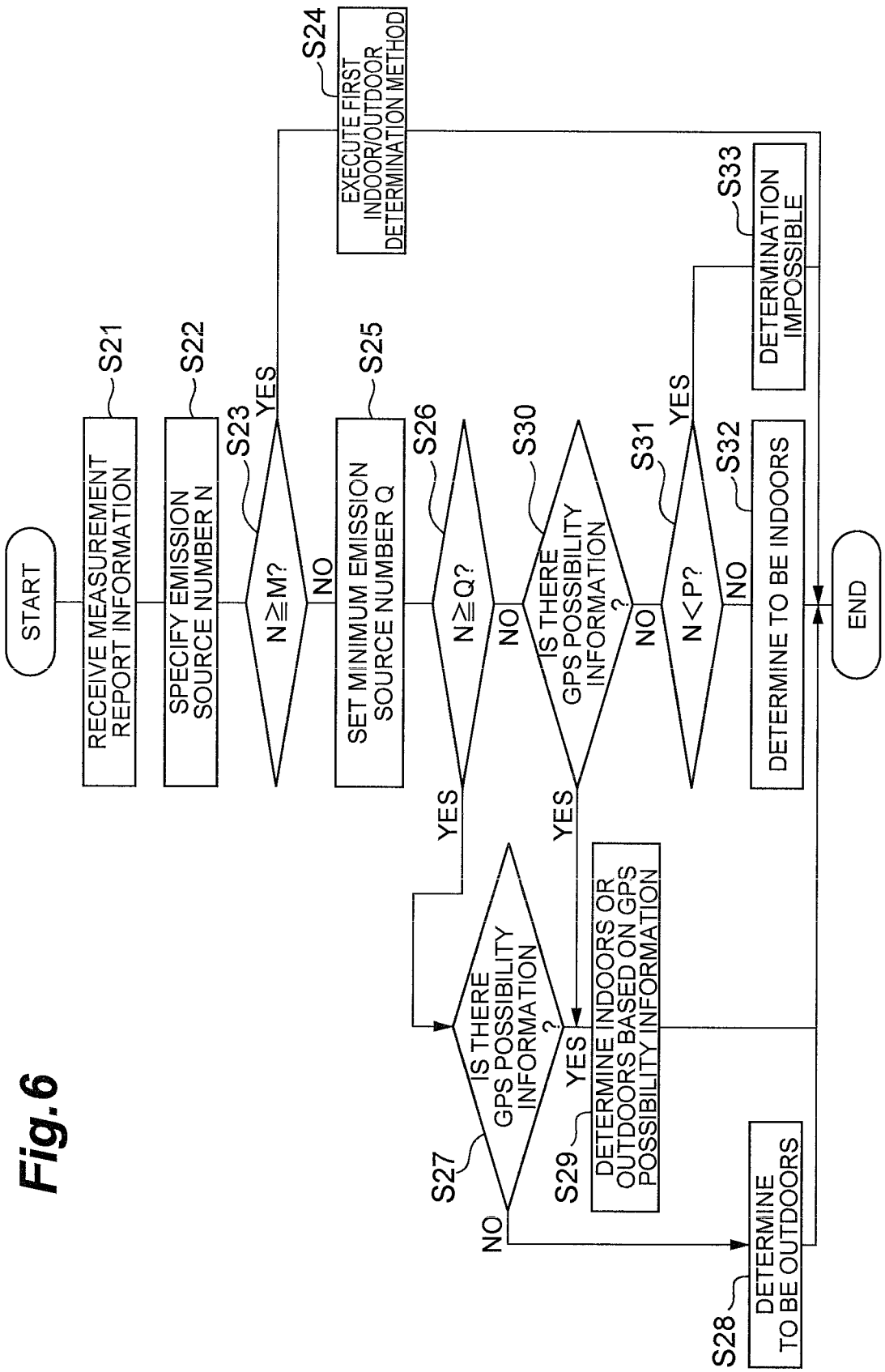
FIG. 6 is a flowchart of indoor/outdoor determination processing (indoor/outdoor determination method)

As discussed above, a determination result as to whether the cellular terminal 20 is indoors or outdoors, or whether it cannot be determined, can be quickly obtained by the indoor/outdoor determination processing in FIG. 6.

As discussed above, with the positioning server 10 pertaining to this embodiment, the execution of indoor/outdoor determination based on the first indoor/outdoor determination method is controlled on the basis of the result of comparing the emission source number N and the minimum emission source number M, and if the execution of indoor/outdoor determination based on the first indoor/outdoor determination method is impossible, it is possible to switch quickly to execution of indoor/outdoor determination based on the second indoor/outdoor determination method. Also, in indoor/outdoor determination based on the second indoor/outdoor determination method, if there is GPS possibility information, a determination of indoors or outdoors can be properly made on the basis of this GPS possibility information, and if there is no GPS possibility information, a determination of indoors or outdoors can be properly made on the basis of the emission source number N, the minimum emission source number Q, and the minimum number of emission sources P at which the second indoor/outdoor determination method is possible.

The determination database 51 can be configured as follows, for example. First, the determination database 51 can be configured by extracting the necessary information (GPS possibility information or information identifying the emission source of a received signal) from a positioning database (not shown) that stores information included in the MR (such as information identifying the emission source of a received signal, the received signal level, information indicating the signal transmission delay, information indicating the amount of attenuation, and information about whether GPS positioning is possible). The above-mentioned positioning database may also be utilized directly as a determination database.

Second, the determination database 51 can be configured using measurement information obtained in the course of configuring a positioning database and ordinary positioning. This second method can be divided into two types: a method that uses measurement data and a method that uses prediction data.

Figure 8:
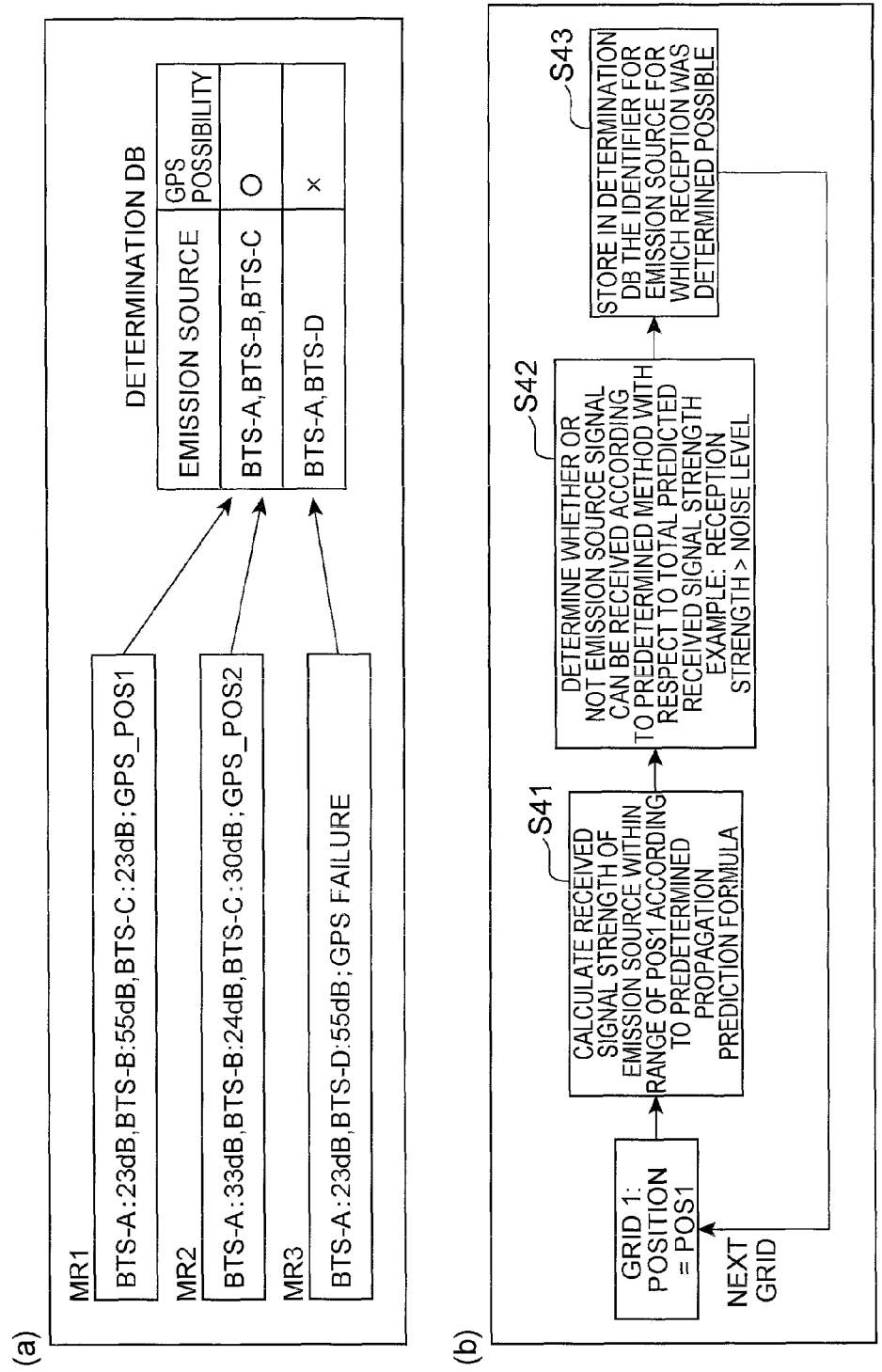
FIG. 8 is a diagram illustrating the construction of a determination database.

Of these, a method that uses measured data involves creating a database by linking the emission source identification information measured at the cellular terminal to whether or not GPS positioning is possible. For example, as shown in (a) of FIG. 8, MR1, MR2, and MR3 including measurement data are received, a database is created by linking a combination of emission source identification information from MR1 and MR2 (BTS-A, BTS-BBTS-C) to information that GPS positioning is possible, and a database is created by linking a combination of emission source identification information from MR3 (BTS-A, BTS-D) to information that GPS positioning is impossible, thereby configuring the determination database in (a) of FIG. 8.

Meanwhile, a method that uses prediction data involves assuming that the entire grid (the individual places resulting from dividing the measured area into a mesh pattern) is outdoors, producing prediction data from a propagation prediction formula that takes into account the landscape and surrounding obstructions for each grid, and creating a database. For example, as shown in (b) of FIG. 8, the received signal strength of all surrounding emission sources in a certain grid (position: POS1) is calculated by a predetermined propagation prediction formula (S41), and it is determined whether or not that emission source signal can be received, according to a predetermined method, with respect to the overall predicted received signal strength (S42). For example, a predetermined noise level is used as a reference, and if the reception strength is higher than this noise level, it is determined that the emission source signal can be received, but if the reception strength is equal to or less than this noise level, it is determined that the emission source signal cannot be received. The combination of identifiers for the emission sources for which reception was deemed possible is stored in the determination database (S43). Thereafter, steps S41 to S43 are executed for each grid to configure a determination database.

Figure 9:
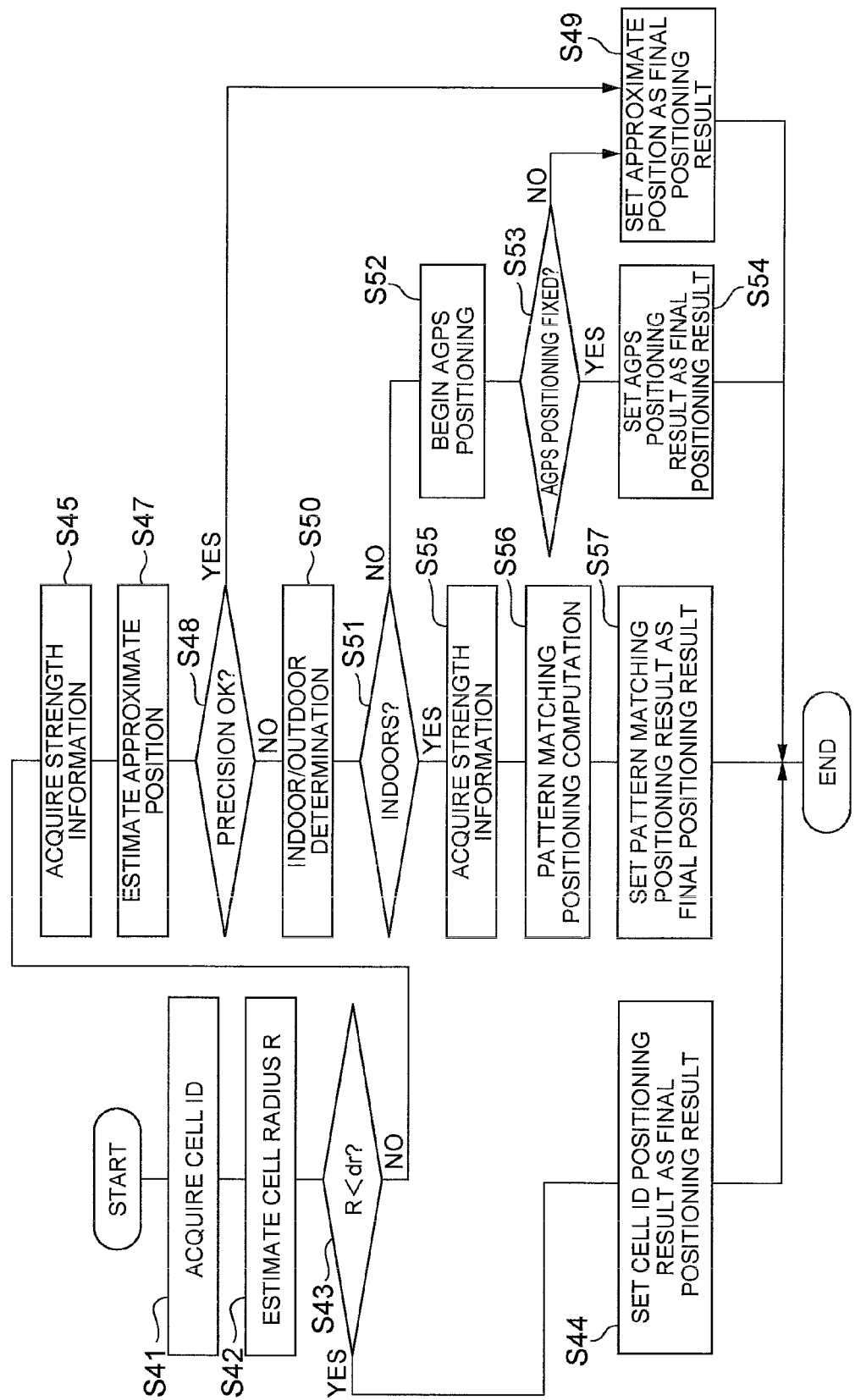
FIG. 9 is a flowchart illustrating the processing (positioning method) executed by a cellular terminal (receiver) and a positioning server constituting the positioning system pertaining to an embodiment of the present invention.

Next, the positioning processing (positioning method) executed by the positioning system 1 pertaining to this embodiment will be described through reference to the flowchart of FIG. 9. This processing is commenced when the positioning server 10 receives a request from the cellular terminal 20 for positioning via the cellular communication network. However, the positioning processing may instead be triggered by something else.

First, the cell ID of the cellular base station 30 that is the emission source of the received radio wave is measured by the cellular communication component 21 of the cellular terminal 20, and information about this cell ID is sent from the cellular communication component 21 to the positioning server 10. At the positioning server 10, the cell ID is received by the reception state information acquisition component 12 via the transceiver 11 (S41, a reception state information acquisition step). The cell ID received by the reception state information acquisition component 12 is outputted to the base station positioning calculator 13.

Next, the radius R of the cell pertaining to the cell ID is estimated by the base station positioning calculator 13 (S42, an approximate position estimation step). The values of the estimated radius R and a previously stored threshold dr are then compared by the base station positioning calculator 13 (S43, an approximate position estimation step). If the estimated radius is below the threshold dr, it can be estimated that the cellular terminal 20 is located at the position of that cell (the position of the cellular base station 30), and that cell ID is used as the positioning result. If it is decided that the estimated radius is not below the threshold dr, then the positioning result is that the position cannot be estimated from the cell ID. The above-mentioned positioning result produced by the base station positioning calculator 13 is inputted to the end decision component 14.

Next, the end decision component 14 decides whether or not to end the estimation of the position of the cellular terminal 20 on the basis of information indicating the positioning result inputted from the base station positioning calculator 13. If the positioning result inputted from the base station positioning calculator 13 is to the effect that positioning could be performed on the basis of the cell ID, the end decision component 14 decides to end the estimation of the position of the cellular terminal 20, then the positioning result produced by cell ID is used as the final positioning result, and the positioning processing is ended (S44, an end decision step).

On the other hand, if the positioning result inputted from the base station positioning calculator 13 is to the effect that positioning cannot be performed on the basis of cell ID, the end decision component 14 decides not to end the estimation of the position of the cellular terminal 20. In that case, a signal that starts processing for pattern matching positioning is sent through the transceiver 11 to the cellular terminal 20 (S45). If the elapsed time of the positioning is used for the decision, the positioning elapsed time is counted from this point in the positioning server 10.

With the cellular terminal 20, this signal is received, reception state information indicating the reception state of the radio wave is measured by the cellular communication component 21, and this information is sent as MR to the positioning server 10. The reception state information continues to be measured (such as at regular intervals) at the cellular terminal 20 even after the MR transmission, and this information is sent as MR to the positioning server 10. Then, at the positioning server 10, the MR is received by the reception state information acquisition component 12 via the transceiver 11 (S45, a reception state information acquisition step). The MR received by the reception state information acquisition component 12 is outputted to the indoor/outdoor determination component 15 and the base station positioning calculator 13.

Then, pattern matching positioning computation is performed by the base station positioning calculator 13 on the basis of the MR inputted from the reception state information acquisition component 12, the approximate position of the cellular terminal 20 is estimated, and the positioning error is calculated (S47, an approximate position estimation step).

The positioning result and positioning error produced by pattern matching positioning are outputted from the base station positioning calculator 13 to the end decision component 14.

Next, the end decision component 14 decides whether or not the positioning error is less than a threshold (S48, an end decision step). If it is decided that the positioning error is below the threshold, the end decision component 14 decides to end the estimation of the position of the cellular terminal 20. In that case, the approximate position is used as the final positioning result, and the positioning processing is ended (S49). If the end decision component 14 decides to end the estimation of the position of the cellular terminal 20, a signal that halts processing for positioning is sent from the end decision component 14 through the transceiver 11 to the cellular terminal 20. When this signal is received by the cellular terminal 20, processing for positioning is halted.

If it is decided that the positioning error is not below the threshold, a notification to this effect is sent from the end decision component 14 to the indoor/outdoor determination component 15. Then, the indoor/outdoor determination component 15 determines whether the cellular terminal 20 is indoors or outdoors on the basis of the MR inputted from the reception state information acquisition component 12 (S50, an indoor/outdoor determination step). The result of determination by the indoor/outdoor determination component 15 is outputted to the positioning controller 16.

Next, the positioning controller 16 controls the positioning method of the cellular terminal 20 on the basis of the result of determination by the indoor/outdoor determination component 15 (S51, a positioning control step). If the result of determination by the indoor/outdoor determination component 15 is that the cellular terminal 20 is located outdoors, then the positioning controller 16 performs control so that the GPS positioning of the cellular terminal 20 is executed (S52, a positioning control step). More specifically, the positioning controller 16 sends a control signal that executes GPS positioning on the cellular terminal 20.

At the cellular terminal 20, this signal is received, which triggers the reception of a signal from the GPS satellite 40 by the GPS reception component 22 and the start of GPS positioning computation (AGPS positioning) by the GPS positioning computer 23 (S52, the positioning control step). At the cellular terminal 20, if the AGPS positioning by the GPS reception component 22 and the GPS positioning computer 23 has succeeded (that is, if a positioning result of a specific precision has been obtained) or failed, information about the positioning result is sent to the positioning server 10. At the positioning server 10, the information about the positioning result produced by AGPS positioning is received by the end decision component 14 through the transceiver 11.

At the positioning server 10, the end decision component 14 decides whether or not the AGPS positioning has succeeded (that is, whether or not the AGPS positioning is fixed) (S53). This decision is made according to whether the positioning result produced by AGPS positioning from the cellular terminal 20 (one in which position of a specific precision has succeeded) is inputted to the end decision component 14. If it is decided that the AGPS positioning has succeeded, the positioning result produced by AGPS positioning is used as the final positioning result, and the positioning processing is ended (S54). If it is decided that the AGPS positioning has not succeeded, the approximate position is used as the final positioning result, and positioning processing is ended (S49).

On the other hand, if the result of determination by the indoor/outdoor determination component 15 in S51 is that the cellular terminal 20 is located indoors, the positioning controller 16 performs control so that pattern matching positioning of the cellular terminal 20 is executed. More specifically, after S45, reception state information is measured at the cellular terminal 20, and this information is sent as MR to the positioning server 10. Then, at the positioning server 10, the MR is received by the reception state information acquisition component 12 via the transceiver 11 (S55, a positioning control step). The MR received by the reception state information acquisition component 12 is outputted to the base station positioning calculator 13.

Then, pattern matching positioning computation is performed by the base station positioning calculator 13 on the new MR inputted from the reception state information acquisition component 12, the position of the cellular terminal 20 is estimated, and the positioning error is calculated (S56, a positioning control step). The positioning result and positioning error produced by pattern matching positioning are outputted from the base station positioning calculator 13 to the end decision component 14. When the positioning result from the base station positioning calculator 13 is inputted to the end decision component 14, it is decided to end the estimation of the position of the cellular terminal 20. In this case, the end decision component 14 uses the positioning result of pattern matching positioning as the position of the cellular terminal 20 (S57). Alternatively, a decision may be made by the end decision component 14 as follows. It is decided whether or not the positioning error of the positioning result obtained by pattern matching positioning computation performed by the base station positioning calculator 13 is below a threshold $\sigma_T$, and it is decided whether or not to end the estimation of the position of the cellular terminal 20.

If it is decided by the end decision component 14 that the positioning error is below the threshold $\sigma_T$, it is decided to end the estimation of the position of the cellular terminal 20. This means that positioning is ended when the positioning result obtained by the pattern matching positioning computation performed by the base station positioning calculator 13 satisfies a specific measurement precision. In this case, the end decision component 14 uses the positioning result of pattern matching positioning as the position of the cellular terminal 20 (S57).

If it is decided that the positioning error is not below the threshold $\sigma_T$, the end decision component 14 decides whether or not the positioning elapsed time is above the threshold T, and decides whether or not to end the estimation of the position of the cellular terminal 20. If the end decision component 14 decides that the positioning elapsed time is above the threshold T, it is decided to end the estimation of the position of the cellular terminal 20. In this case, the end decision component 14 uses the positioning result of pattern matching positioning as the position of the cellular terminal 20 (S57).

If the end decision component 14 decides to end the estimation of the position of the cellular terminal 20, a signal that halts processing for positioning is sent from the end decision component 14 through the transceiver 11 to the cellular terminal 20. When this signal is received at the cellular terminal 20, processing for positioning (MR measurement and transmission) is ended.

If it is decided that the positioning error is not below the threshold $\sigma_T$, and it is decided that the positioning elapsed time is not above the threshold T, then MR is again received by the reception state information acquisition component 12 through the transceiver 11 according to the transmission from the cellular terminal 20, pattern matching positioning computation is performed by the base station positioning calculator 13 (S55, S56), and the same processing as above is repeated (repeated processing is not depicted).

The information indicating the final positioning result (information indicating the estimated position of the cellular terminal 20) obtained as above (S49, S54, S57) is outputted corresponding to the usage details, such as sending it to the cellular terminal 20.

With the positioning system 1 pertaining to this embodiment, as discussed above, the approximate position of the cellular terminal 20 is estimated and the precision of this approximate position is calculated on the basis of MR measured by the cellular terminal 20. It is decided whether or not to end the estimation of the position of the receiver on the basis of the precision of this approximate position. Therefore, as long as the precision of the approximate position is sufficiently high, GPS positioning is not performed at this point, and the estimation of the position of the cellular terminal 20 is ended. Meanwhile, with the positioning system 1 pertaining to this embodiment, it is determined whether the cellular terminal 20 is indoors or outdoors on the basis of MR measured by the cellular terminal 20. The execution of GPS positioning is controlled on the basis of the decision as to whether or not to end the estimation of the position of the cellular terminal 20, and the determination as to whether the cellular terminal 20 is indoors or outdoors.

Therefore, if the cellular terminal 20 has adequate precision of the approximate position without GPS positioning being performed, or if it is in a state in which GPS positioning is difficult to perform, it does not execute GPS positioning, but otherwise it can perform control that executes GPS positioning, etc. Also, as discussed above, with the positioning system 1, control about whether or not GPS positioning can be executed can be performed without actually performing GPS positioning, which takes a long time to decide whether or not it can be performed. Specifically, with the positioning system 1 pertaining to this embodiment, a positioning result that corresponds to the state of the receiver can be obtained in less time.

Also, if pattern matching positioning is performed when the cellular terminal 20 is located indoors and GPS positioning is not to be performed, as in this embodiment, then the positioning result of the cellular terminal 20 can be obtained even though GPS positioning is not performed.

Also, it is preferable for the positioning based on MR to be pattern matching positioning as in this embodiment. With this constitution, the position of the cellular terminal 20 can be estimated reliably and properly on the basis of MR. However, the positioning method based on MR does not necessarily have to entail pattern matching, and instead, for example, the distance between the various cellular base stations 30 and the cellular terminal 20 may be found on the basis of RTT, and the position of the cellular terminal 20 estimated on this basis.

Also, it is preferable for positioning based on cell ID to be performed at the beginning of the overall positioning processing. With this constitution, for example, if the cellular terminal 20 is in a place where the cellular base station 30 are located close together, or another such environment, the positioning result can be acquired easily. Positioning based on cell ID does not necessarily have to be performed, however.

In this embodiment, pattern matching positioning computation, indoor/outdoor determination, positioning method control, decision to end the positioning processing, and so forth were performed by the positioning server 10, but all of these may instead be performed at the cellular terminal 20. Specifically, the positioning system 1 may be the cellular terminal 20 itself. Conversely, the positioning system 1 may be the positioning server 10 itself. In that case, the positioning server 10 receives all information for performing positioning computation from the cellular terminal 20. For example, AGPS positioning computation may be performed by the positioning server 10.

The two modification examples given below may be employed as embodiments of the indoor/outdoor determination component 15. In the first modification example, the determination database 51 does not store indoor/outdoor characteristic information (GPS possibility information in the above embodiment), and indoor/outdoor determination based on indoor/outdoor characteristic information is not performed. In the second modification example, indoor/outdoor determination based on indoor/outdoor characteristic information is not performed, nor is indoor/outdoor determination based on the first indoor/outdoor determination method. These modification examples will now described in order.

First Modification Example

Figure 10:
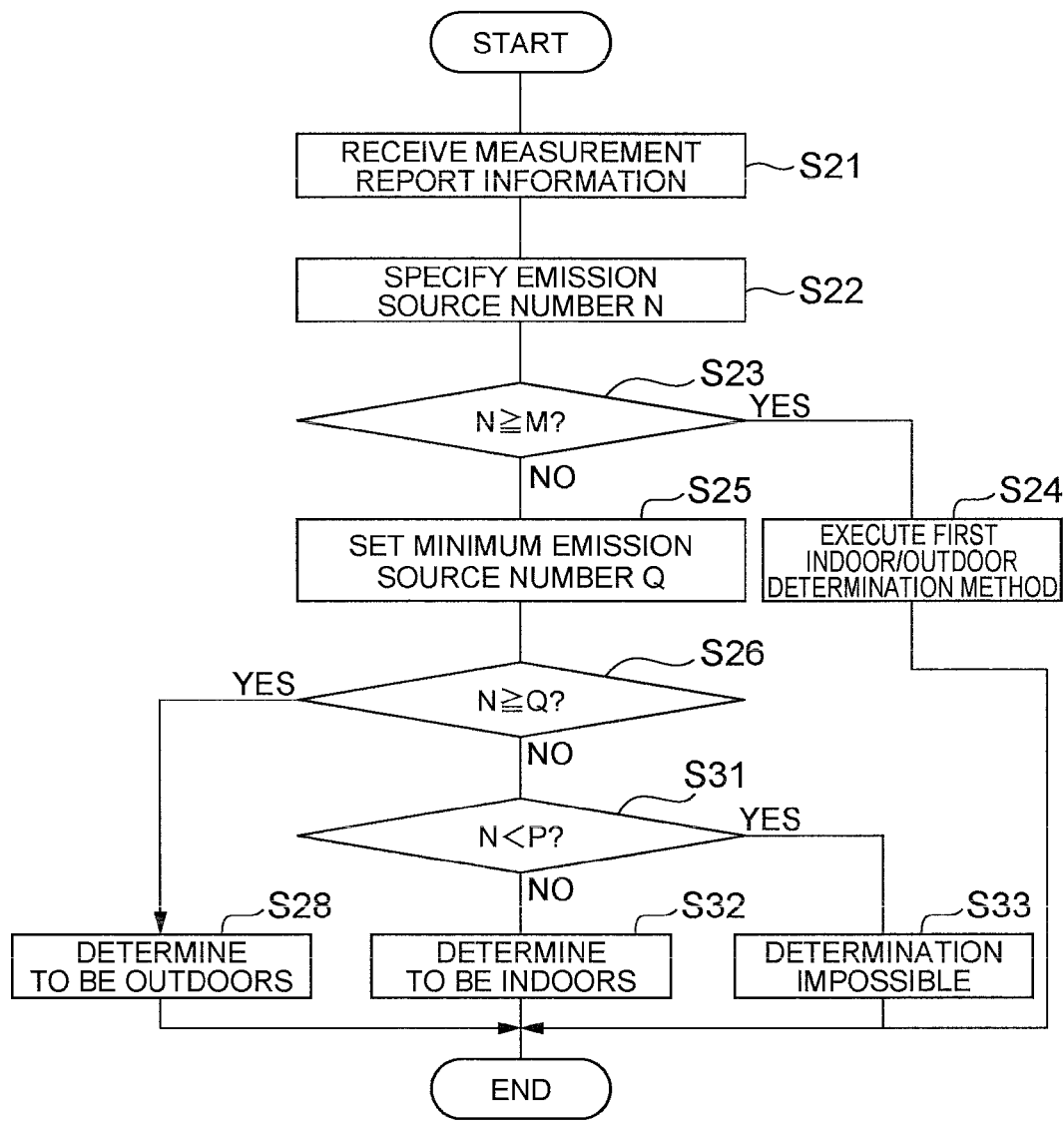
FIG. 10 is a flowchart illustrating a first modification example of indoor/outdoor determination processing (indoor/outdoor determination method)

The functional configuration of the indoor/outdoor determination component 15 in the first modification example is the same as the functional configuration shown in FIG. 3 and discussed above, but the indoor/outdoor determination processing (indoor/outdoor determination method) is expressed by the flowchart in FIG. 10. Specifically, in the indoor/outdoor determination processing in the first modification example, first the reception component 52 of the indoor/outdoor determination component 15 receives from the cellular terminal 20 MR including emission source identification information about the received signal (S21 in FIG. 10), and the specification component 53 counts the number of pieces of emission source identification information included in the received MR, and thereby specifies the emission source number N of the received signal (S22). Next, the possibility determination component 54 determines whether or not the emission source number N is equal to or greater than the minimum emission source number M at which indoor/outdoor determination based on the first indoor/outdoor determination method is possible (S23).

In S23, if the emission source number N is equal to or greater than the minimum emission source number M, it can be decided that indoor/outdoor determination based on the first indoor/outdoor determination method is possible, so the first indoor/outdoor determination component 55 executes indoor/outdoor determination on the basis of the first indoor/outdoor determination method (S24).

Meanwhile, in S23, if the emission source number N is less than the minimum emission source number M, it can be decided that indoor/outdoor determination based on the first indoor/outdoor determination method is impossible, and the second indoor/outdoor determination component 56 executes indoor/outdoor determination based on the second indoor/outdoor determination method as follows. The second indoor/outdoor determination component 56 extracts from the determination database 51 combined information including all of the emission source identification information included in the MR, and sets the lowest value of the number of emission sources included in the extracted combined information as the minimum emission source number Q (S25).

Then, the second indoor/outdoor determination component 56 determines whether or not the emission source number N is equal to or greater than the minimum emission source number Q (S26). In S26, if the emission source number N is equal to or greater than the minimum emission source number M, it can be decided that the cellular terminal 20 has received signals from at least the minimum emission source number M of emission sources, so it is determined that the cellular terminal 20 is outdoors (S28).

On the other hand, if in S26 the emission source number N is less than the minimum emission source number M, it is determined whether or not the emission source number N is less than the minimum emission source number P at which indoor/outdoor determination based on the second indoor/outdoor determination method is possible (S31), and if the emission source number N is less than the minimum emission source number P, it is determined that indoor/outdoor determination based on the second indoor/outdoor determination method is impossible (S33). On the other hand, if the emission source number N is equal to or greater than the minimum emission source number P in S31, it can be decided that indoor/outdoor determination based on the second indoor/outdoor determination method is possible, but the cellular terminal 20 has not received signals from at least the minimum emission source number M of emission sources, and the reception state is poor, so it is determined that the cellular terminal 20 is indoors (S32).

As discussed above, a determination result as to whether the cellular terminal 20 is indoors or outdoors, or whether it cannot be determined, can be quickly obtained by the indoor/outdoor determination processing in FIG. 10.

Second Modification Example

Figure 11:
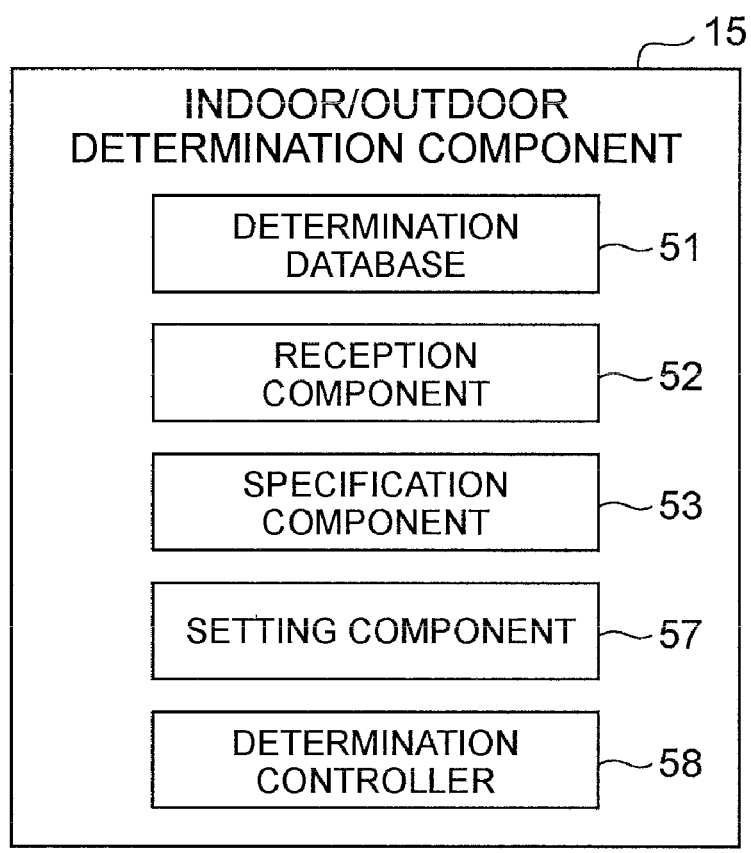
FIG. 11 is a diagram illustrating the functional configuration of a second modification example of an indoor/outdoor determination component.

As shown in FIG. 11, the indoor/outdoor determination component 15 in the second modification example comprises the same determination database 51, reception component 52, and specification component 53 as in the above embodiment, as well as a setting component 57 and a determination controller 58. Of these, the setting component 57 extracts from the determination database 51 combined information including all of the emission source identification information included in the MR, and sets the lowest value of the number of emission sources included in the extracted combined information as the minimum emission source number Q. The determination controller 58 performs indoor/outdoor determination by the procedure discussed below, on the basis of the emission source number N, the minimum emission source number Q, and the minimum emission source number P at which indoor/outdoor determination is possible.

Figure 12:
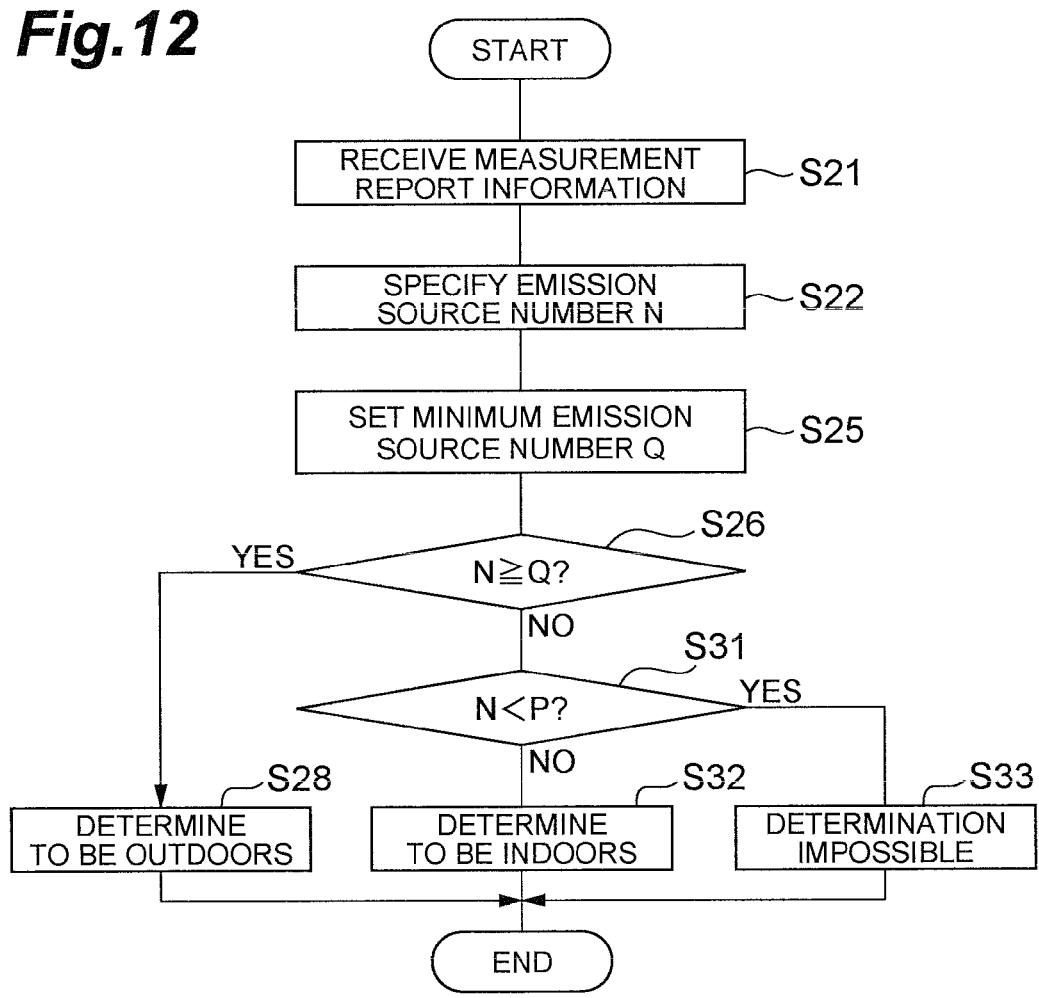
FIG. 12 is a flowchart illustrating a second modification example of an indoor/outdoor determination component.

The indoor/outdoor determination processing (indoor/outdoor determination method) in the second modification example is expressed by the flowchart in FIG. 12. Specifically, the reception component 52 of the indoor/outdoor determination component 15 receives from the cellular terminal 20 MR including the emission source identification information for the received signal (S21 in FIG. 12), and the specification component 53 counts the number of pieces of emission source identification information included in the received MR and thereby specifies the emission source number N of the received signal (S22). Then, the setting component 57 extracts from the determination database 51 combined information including all of the emission source identification information included in the MR, and sets the lowest number of emission sources included in the extracted combined information as the minimum emission source number Q (S25).

Next, the determination controller 58 determines whether or not the emission source number N is equal to or greater than the minimum emission source number Q (S26). If the emission source number N is equal to or greater than the minimum emission source number M in S26, it can be decided that the cellular terminal 20 has received a signal from at least the minimum emission source number M of emission sources, so it is determined that the cellular terminal 20 is outdoors (S28).

On the other hand, if the emission source number N is less than the minimum emission source number M in S26, it is determined whether or not the emission source number N is less than the minimum emission source number P at which indoor/outdoor determination based on the second indoor/outdoor determination method is possible (S31), and if the emission source number N is less than the minimum emission source number P, it is determined that indoor/outdoor determination based on the second indoor/outdoor determination method is impossible (S33). On the other hand, if the emission source number N is equal to or greater than the minimum emission source number P, it is determined that indoor/outdoor determination is possible on the basis of the second indoor/outdoor determination method, but that the cellular terminal 20 is indoors since it can be decided that the cellular terminal 20 has not received a signal from at least the minimum emission source number M of emission sources, and the reception state is inferior (S32).

As discussed above, a determination result as to whether the cellular terminal 20 is indoors or outdoors, or whether it cannot be determined, can be quickly obtained by the indoor/outdoor determination processing in FIG. 12. The indoor/outdoor determination with respect to the cellular terminal 20 performed by the indoor/outdoor determination component 15 is not necessarily limited to the method discussed above, and any method can be used as long as it makes use of reception state information indicating the reception state of radio waves at the cellular terminal 20.

What is claimed is:

1. A positioning system for estimating the position of a receiver that has a wireless communication function and a receiving function for signals used in GPS positioning, the system comprising:
   reception state information acquisition means for acquiring reception state information indicating the reception state of a radio wave produced by the wireless communication function of the receiver;
   approximate position estimation means for estimating the approximate position of the receiver and computing the precision of the approximate position on the basis of the reception state information acquired by the reception state information acquisition means;
   end decision means for deciding whether or not to end the estimation of the position of the receiver on the basis of the precision computed by the approximate position estimation means, and, if it is decided to end the estimation, estimating the position of the receiver as the approximate position estimated by the approximate position estimation means and ending the estimation of the position;
   indoor/outdoor determination means for determining whether the receiver is indoors or outdoors on the basis of the reception state information acquired by the reception state information acquisition means; and
   positioning control means for controlling the execution of GPS positioning of the receiver on the basis of a result of decision by the end decision means and a result of determination by the indoor/outdoor determination means.

2. The positioning system according to claim 1, wherein the positioning control means controls the execution of positioning that estimates the position of the receiver on the basis of the result of decision by the end decision means and the result of determination by the indoor/outdoor determination means and also on the basis of new reception state information acquired by the reception state information acquisition means, at a timing that differs from that of the reception state information used to estimate the approximate position by the approximate position estimation means.

3. The positioning system according to claim 2,
   wherein the reception state information acquisition means acquires strength information indicating the reception strength corresponding to an emission source of the radio wave as the reception state information, and
   the estimation of the approximate position by the approximate position estimation means and the estimation of the position of the receiver which uses the reception state information and the execution of which is controlled by the positioning control means, are carried out by a method in which the position of the receiver is estimated by storing in advance information indicating the relation between the position and reception strength of the radio wave corresponding to the emission source of the radio wave, and by comparing the strength information acquired by the reception state information acquisition means with the information stored in advance.

4. The positioning system according to claim 1,
   wherein the reception state information acquisition means acquires information indicating the emission source of the radio wave received by the receiver as the reception state information,
   the approximate position estimation means acquires information indicating the size of a communication area of the emission source indicated by the information acquired by the reception state information acquisition means, and estimates the position of the receiver on the basis of the size of the communication area, and
   the end decision means decides whether or not to end the position estimation by the position estimation means on the basis of the information indicating the size of the communication area of the emission source acquired by the approximate position estimation means.

5. A positioning method for estimating the position of a receiver that has a wireless communication function and a receiving function for signals used in GPS positioning, the method comprising:
   a reception state information acquisition step of acquiring reception state information indicating the reception state of a radio wave produced by the wireless communication function of the receiver;
   an approximate position estimation step of estimating the approximate position of the receiver and computing the precision of the approximate position on the basis of the reception state information acquired in the reception state information acquisition step;
   an end decision step of deciding whether or not to end the estimation of the position of the receiver on the basis of the precision computed in the approximate position estimation step, and, if it is decided to end the estimation, estimating the position of the receiver as the approximate position approximate position estimated in the approximate position estimation step and ending the estimation of the position;
   an indoor/outdoor determination step of determining whether the receiver is indoors or outdoors on the basis of the reception state information acquired in the reception state information acquisition step; and
   a positioning control step of controlling the execution of GPS positioning of the receiver on the basis of a result of decision in the end decision step and a result of determination in the indoor/outdoor determination step.

* * * * *